US008505060B2

(12) United States Patent
Baillavoine et al.

(10) Patent No.: US 8,505,060 B2
(45) Date of Patent: Aug. 6, 2013

(54) USE OF A FEEDBACK CHANNEL FOR IMAGE BROADCASTING

(75) Inventors: Marc Baillavoine, Buc (FR); Joël Jung, Le Mesnil Saint Denis (FR); Loïc Baroux, Levallois-Perret (FR)

(73) Assignee: France Telecom, Paris (FR)

( * ) Notice: Subject to any disclaimer, the term of this patent is extended or adjusted under 35 U.S.C. 154(b) by 1036 days.

(21) Appl. No.: 12/227,824

(22) PCT Filed: May 22, 2007

(86) PCT No.: PCT/FR2007/051309
§ 371 (c)(1),
(2), (4) Date: Nov. 28, 2008

(87) PCT Pub. No.: WO2008/043923
PCT Pub. Date: Apr. 17, 2008

(65) Prior Publication Data
US 2009/0138933 A1    May 28, 2009

(30) Foreign Application Priority Data
May 29, 2006  (FR) ..................................... 06 04777

(51) Int. Cl.
*H04N 7/173* (2011.01)
*H04N 7/16* (2011.01)

(52) U.S. Cl.
USPC ........... 725/118; 725/105; 725/114; 725/121; 725/131; 725/151

(58) Field of Classification Search
USPC ................. 725/105, 114, 118, 121, 131, 144, 725/151
See application file for complete search history.

(56) References Cited

U.S. PATENT DOCUMENTS
5,528,284 A  *  6/1996  Iwami et al. ............... 348/14.15
5,847,763 A  *  12/1998  Matsumura et al. ..... 375/240.15
(Continued)

FOREIGN PATENT DOCUMENTS
EP       0753 968 A2    1/1997
EP       1560 434 A     8/2005
WO    WO 02/35847 A     5/2002

OTHER PUBLICATIONS

Even Polycom R: "RTP Payload Format for H. 261 Video Streams" IETF Standard-Working-Draft, Internet Engineering Task Force, IETF,CH, vol. avt. No. 13, Jan. 23, 2006, XP015043553 ISSN: 0000-0004, p. 11, paragraph 5.

(Continued)

*Primary Examiner* — Chris Parry
*Assistant Examiner* — Gigi L Dubasky
(74) *Attorney, Agent, or Firm* — Knobbe Martens Olson & Bear LLP

(57) ABSTRACT

A method for broadcasting images from a video sequence, the method comprising, at the level of broadcasting equipment: including images in an output stream for transmission to at least one restoration equipment, receiving feedback from said restoration equipment of error messages relating to the restoration of the images from the video sequence, analyzing the error messages in order to identify images or parts of images not restored or badly restored and determining response messages including correction images or image parts. The method furthermore comprising determining a level of seriousness for each error message according to the analysis performed and deciding to return a response message relating to an error message according to the level of seriousness of that error message.

14 Claims, 3 Drawing Sheets

U.S. PATENT DOCUMENTS

| | | |
|---|---|---|
| 6,289,054 B1 | 9/2001 | Rhee |
| 6,636,981 B1 * | 10/2003 | Barnett et al. ............... 714/4.5 |
| 2004/0088642 A1 * | 5/2004 | Imura et al. ............... 714/776 |

OTHER PUBLICATIONS

Adamson, B. et al.: "Multicast Negative-Acknowledgment (NACK) Building Blocks" IETF Standard-Working-Draft, Internet Engineering Task Force, IETF, CH, vol. rmt. No. 1, Mar. 2006, XP015044069 ISSN: 0004-0004, p. 24, paragraph 3.2.4.

Eckehard Steinback et al.: "Standard Compatible Extension of H.263 for Robust Video Transmission in Mobile Environments" IEEE Transactions on Circuits and Systems for Video Technology, IEEE Service Center, Piscataway, NJ, US, vol. 7, No. 7, Dec. 1997, XP011014436, ISSN: 1051-8215, pp. 872-873, paragraph I; pp. 874-875, paragraph III.

Bernd Girod et al: "Feedback-Based Error Control for Mobile Video Transmission" Proceedings of the IEEE, IEEE. New York, US, vol. 87, No. 10, Oct. 1, 1999, pp. 1707-1723 (XP011044278 ISSN: 0018-9219).

* cited by examiner

USE OF A FEEDBACK CHANNEL FOR IMAGE BROADCASTING

This application is a 35 U.S.C. §371 National Stage entry of International Patent Application No. PCT/FR2007/051309, filed on May 22, 2007, and claims priority to French Application No. FR 0604777, filed on May 29, 2006, both of which are hereby incorporated by reference in their entireties.

The present invention relates to techniques for broadcasting images from a video sequence. It applies to situations where a sequence of images is transmitted to one or more decoders which use a feedback channel for providing information explicitly or implicitly indicating if the images of the video signal have been appropriately restored.

BACKGROUND OF THE INVENTION

Many video encoders support an inter-image coding mode (interframe coding hereafter interceding), in which the current image is coded with respect to one or more preceding images.

Each image can also be coded without reference to the others, that coding is called intraframe coding (hereafter intracoding). For a given transmission rate, intracoding gives poorer video quality than does interceding since it does not take advantage of the temporal correlations between the successive images of the video sequence.

Currently, a portion of video sequence has its first image intracoded then the following images are intercoded.

A problem with interceding is its behaviour in the presence of transmission error or packet losses on the transmission channel. The degradation or the loss of an image propagates over the following images until a new intracoded image appears.

It is common that the transmission mode of the signal generates total or partial losses of certain images. From such losses there results, for example, the loss or the late arrival of certain data packets when the transmission takes place on a packet network with no guarantees of delivery such as the IP (Internet Protocol) network. Losses can also result from errors introduced by the transmission channel beyond the correction capabilities of the correcting codes used.

In an environment subject to various signal losses, it is necessary to provide mechanisms for improving the quality of the image at the level of the decoder. One of these mechanisms is the use of a feedback channel, from the decoder to the coder, upon which the decoder informs the coder that it has lost all of part of certain images. In certain cases, it is the well-reconstructed images that the decoder indicates to the coder on the feedback channel so that the coder can derive from this which images have possibly been lost.

In response to each of these error messages, most coders systematically return intracoded correction images, i.e. without reference to the preceding images, which makes it possible to refresh the display and to correct errors due to transmission losses.

The correction images are transmitted in response messages during specific transmissions or by insertion in the stream of the video sequence in replacement of other images.

Such a use of the feedback channel has significant disadvantages when several error messages are transmitted on the feedback channel. The present principle results in a response being given to each of these messages. For example, if an image is lost, the decoder is likely to send an error message on the feedback channel for each of the following interceded images with a reference to the lost image. In this case, the encoder is made to transmit several response messages each comprising an intracoded correction image. This results in a reduced restoration quality and a significant occupation of bandwidth.

Similarly, in certain multi-broadcast embodiments, such as conferencing bridge systems or others in which several decoders receive the same information, it happens that each of the decoders transmits an error message on a feedback channel relating to a same lost image and that the encoder responds successively to each of these messages retransmitting the same correction image several times.

Thus, the use made of feedback channels is not optimum in particular when several messages are transmitted on the feedback channel.

One of the advantages of the present invention is to improve the use of the feedback channel.

The invention thus proposes a method for broadcasting images from a video sequence, the method comprising the following steps, at the level of broadcasting equipment:
  including images in an output stream for transmission to at least one restoration equipment;
  receiving feedback from said restoration equipment of error messages relating to the restoration of the images from the video sequence;
  analyzing the error messages in order to identify images or parts of images not restored or badly restored;
  determining response messages including images or image of correction parts,
characterized in that the method furthermore comprises:
  determining a level of seriousness for each error message according to the analysis performed; and
  deciding to return a response message relating to an error message according to the level of seriousness of that error message.

Consequently, the method of the invention comprises an analysis of the error messages and the quantification of the seriousness of these messages in order to be able to decide if it is appropriate to respond to them. This quantification makes it possible to optimise the use of the feedback channel by the optimisation of the response messages.

In a particular embodiment, said analysing comprises determining at least one factor originating from the following group:
  a restoration quality level taking account of the error;
  an evaluation of the importance of the content of images or image parts which are not restored or badly restored;
  decoding parameters;
  an evaluation of the transmission conditions; and
  an estimation of the time between the current image and the last image transmitted without error,
said factor being used for determining the level of seriousness associated with an error message.

Advantageously, said level of seriousness of at least one error message is a maximum waiting time before the transmission of a response message. This makes it possible to ensure the transmission of a response message for certain error messages.

As a variant, the method comprises determining an emergency level from the levels of seriousness associated with the error messages received since the transmission of the last response message and said deciding is carried out according to this emergency level. This embodiment has the advantage of determining an emergency quantifier from several error messages.

Advantageously, said determining response messages comprises grouping response messages. This makes it possible to reduce the number of response messages with respect to the number of error messages.

In a particular embodiment, said analysing comprises identifying a last image transmitted without error and said determining a response message comprises encoding a correction image with respect to said last image transmitted without error. This embodiment makes it possible to avoid the transmission of an intracoded image in order to improve the quality of the restoration.

Alternatively, said including images in a stream comprises formatting several input streams in order to form said output stream, said analysing the error messages comprises identifying images which are not restored or badly restored in said input streams and said determining a response message comprises modifying correction images originating from said input streams in order to make them conform with the format of the output stream.

Moreover, the invention also relates to a computer program or broadcasting equipment implementing the method previously referred to as well as to an image broadcasting system using such broadcasting equipment.

BRIEF DESCRIPTION OF THE DRAWINGS

The invention will be better understood in the light of the description and the drawings in which.

DESCRIPTION OF THE PREFERRED EMBODIMENTS

Figure 1:
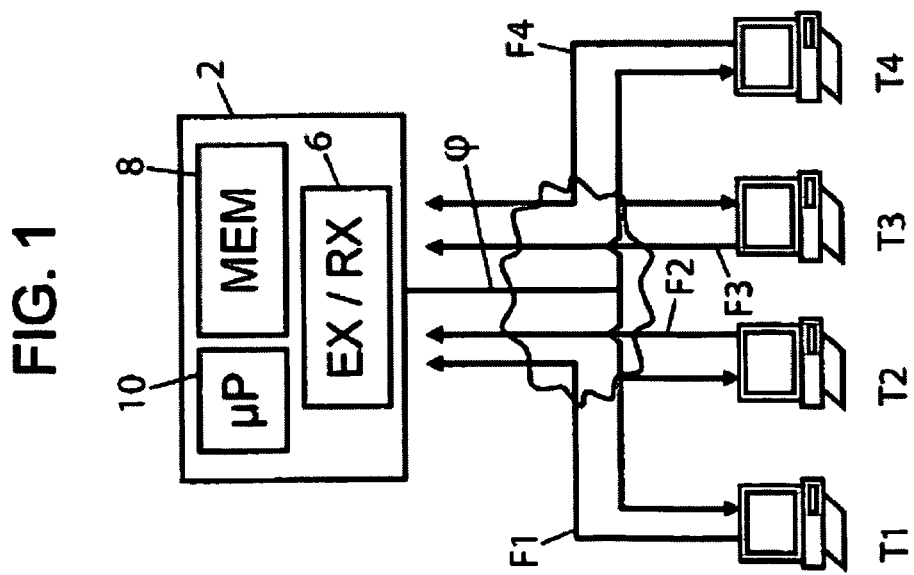
FIG. 1 is a block diagram of a bridge of video sequences broadcasting system.

The system shown in FIG. 1 comprises several terminals referenced T1 to T4 and formed, for example, by personal computers. These terminals are connected, by a telecommunications networks 4 of the IP type to a broadcasting equipment 2 which, in the example, is a telecommunications server providing a conferencing bridge function.

The terminals T1 to T4 are adapted for the acquisition and transmission of a video and audio stream by means, for example, of cameras connected directly to each of the computers.

The conferencing bridge 2 comprises means 6 of transmission and reception of an audio and video stream as well as a memory 8 and a microcontroller or microprocessor 10, these elements being conventional in themselves.

The microprocessor 10 comprises, in a memory, a specific program comprising software instructions capable of making it carry out the method of the invention when they are executed by that microprocessor.

During an initial configuration phase, it is convenient, between the conferencing bridge and the various terminals, to broadcast a combined image to the terminals and to use a feedback channel for the detection of transmission errors.

More precisely, each of the terminals T1 to T4 transmits a video stream F1 to F4 intended for the conferencing bridge 2, each of these streams comprises images encoded conventionally, for example according to the H263 protocol with a specific size and resolution.

Figure 2:
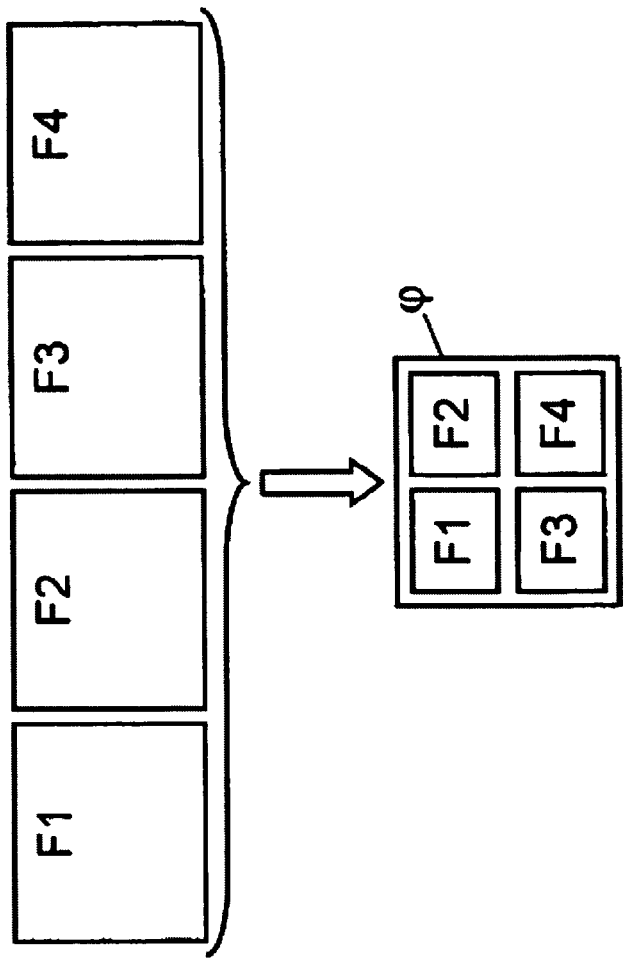
FIG. 2 is a symbolic representation of a combined video image.

In the configuration described, the conferencing bridge 2 retransmits the input streams F1 to F4 whilst reorganising them in such a way as to generate an output stream φ which is decodable by the other terminals. This reorganisation corresponds to a shaping, or formatting, of the input streams F1 to F4, each image of an input stream being placed in a specific sector of the corresponding image in the output stream φ. FIG. 2 is a diagrammatic representation of an image of the output stream comprising four sectors, one for each input stream F1 to F4.

The output stream is transmitted conventionally to all the terminals T1 to T4.

Figure 3:
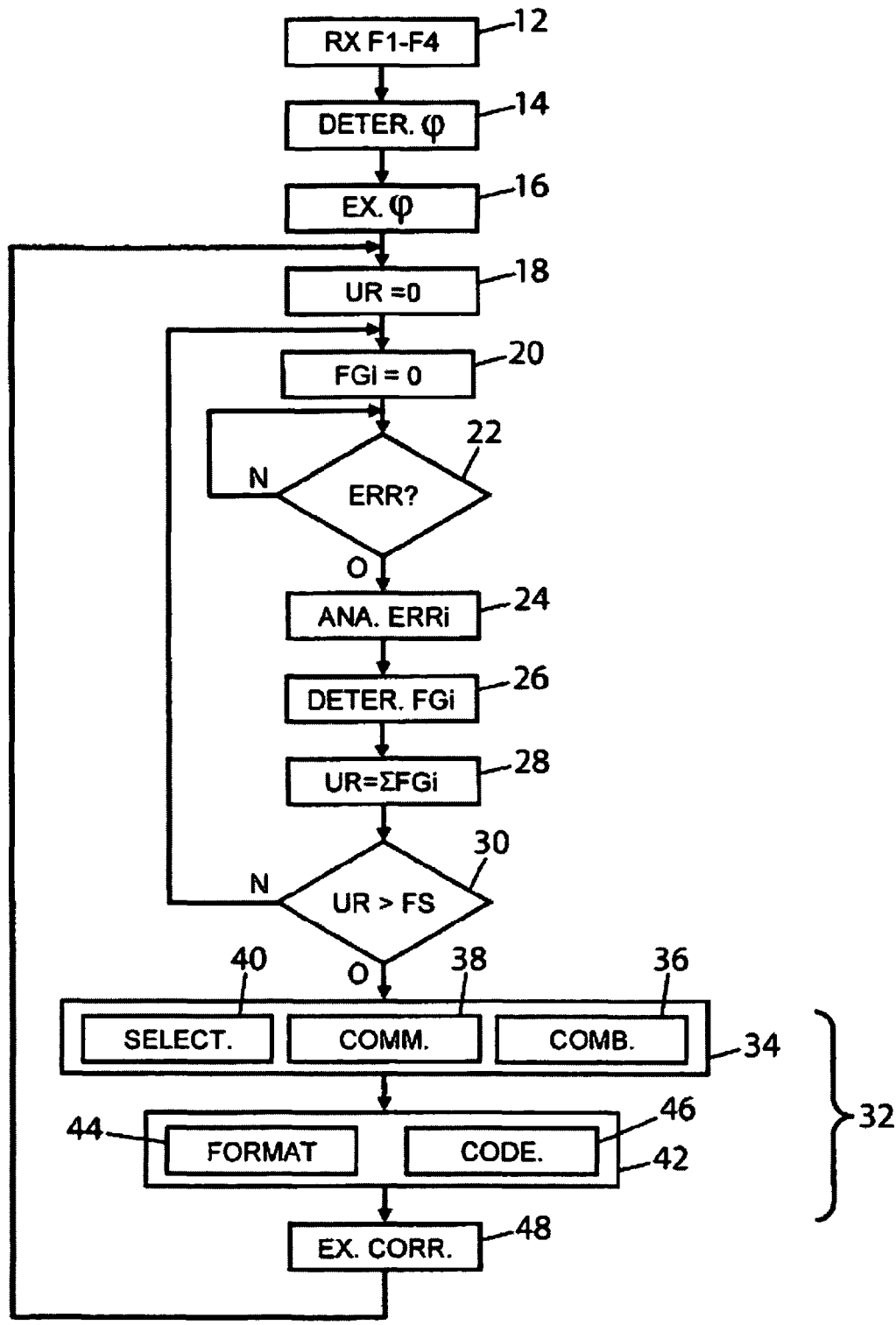
FIG. 3 is the flowchart of the method of the invention.

The method of the invention will now be described with reference to FIG. 3

The method starts with a step 12 of reception of the input streams F1 to F4, followed by a step 14 of combination of these streams in order to form the output stream φ which is transmitted simultaneously to the four terminals during a step 16.

Each of the terminals T1 to T4 then receives the stream φ, decodes it and analyses the decoded images.

In case of a loss of packets or a deterioration in the quality of the images, each of the terminals is able to transmit an error message relating to the restoration of the images of the video sequence to the broadcasting equipment formed by the conferencing bridge 2.

In the example, the method comprises a step 18 of initialisation of a variable UR corresponding to an urgency or emergency level of the transmission of a response message, and a step 20 of initialisation of variables FGi corresponding to levels of seriousness associated with the received error messages.

After having transmitted images of a video sequence in step 16, the conferencing bridge 2 monitors the possible arrival of error messages. This is carried out during a test step 22 for verifying if all the error messages received have been processed. This step 22 is repeated as long as no error messages are received.

Subsequently, one or more error messages are received by the conferencing bridge 2.

Following the detection of the reception of a first error in step 22, the method comprises an analysis step 24 which allows the determination of a level of seriousness associated with the error, in a step 26.

In the example, the analyse 24 comprises an evaluation of a quality level of the restoration calculated as a function of the percentage of image fragments or macroblocks lost, i.e. corresponding to the quotient of the number of blocks lost divided by the total number of blocs in the image. This evaluation of the quality factor is represented by fq and is calculated as follows:

$$fq = \frac{N_p}{N_t}$$

Where $N_p$ is the number of blocks lost and $N_t$ is the total number of blocks in the image.

Advantageously, the analysis also comprises an evaluation of the importance of the content of the lost part in order to determine the level of seriousness. Thus, if the lost part corresponds to a uniform background, the loss is considered as less important than if the lost area contains an object in motion. For example, this analysis of the content is performed by comparison of the lost area between the different preceding images available in the memory 10.

Similarly, the location of the lost part can also be taken into account in order to evaluate its importance. For example, the central area of the image is considered as more important than the peripheral areas.

As a variant, the analysis of the error message comprises the evaluation of parameters linked with the decoding such as the sequence or image parameters or of image usually called SPS (Sequence Parameter Set) and PPS (Picture Parameter Set).

Alternatively, the analysis 24 comprises the identification of the last image transmitted without errors and of the time elapsed between the current image and this last image. The longer this time is, the more the correction will induce degradation in quality. In the example, this time factor is referenced ft and is calculates as follows:

$$ft = \begin{cases} \dfrac{I_c - I_{dic}}{N_m} & \text{if } I_c - I_{dic} < N_m \\ ft = Fs & \text{if } I_c - I_{dic} \geq N_m \end{cases}$$

In these equations, $I_c$ is the number of the current image, $I_{dic}$ is the number of the last correct image and $N_m$ represents the number of images in the memory 10 of the bridge 2. Fs represents a reaction threshold of the bridge, i.e. the maximum duration stored in the memory 10. If the time separating the current image from the last correct image is greater than the duration of the memory, the last correct image is no longer available in the memory 10 and a fixed value is allocated to Ft.

Advantageously, the analysis 24 takes into account the transmission conditions and in particular the evolution of the behaviour of the transmission channel between the conferencing bridge and the terminals. In the described embodiment, the probability that a loss will occur on another channel is estimated from loss statistics provided by the equipments of the network and is taken into account. The higher this probability is the longer the duration of the delay before transmission of a response will be because the risk of another error message occurring is high. This statistical factor is referenced Fstat and is calculated as follows:

$$fstat = Pr = \dfrac{\sum_{N_t} Pr(i)}{N_t}$$

Where $Pr(i)$ represents the percentage of losses on channel i between the bridge 2 and the terminal Ti, and $N_t$ represents the total number of terminals in conference, i.e. four in this example.

As a function of all these factors, the level of seriousness FGi is determined for each error message during a step 26. In the example, this level of seriousness is obtained by summing the values obtained for each factor with, advantageously, coefficients, referenced λ, weighting the relative importance of the factors. Thus:

$$FGi = fq + \lambda it \cdot ft + \lambda istat \cdot fstat$$

The method then comprises a step 28 of determination of the current emergency level, referenced UR, corresponding to the sum of the levels of seriousness FGi of all the messages received since the transmission of the last response message.

This emergency level corresponds to a quantification of the overall emergency of a response to the different error messages received.

The method then comprises a step 30 of deciding whether to return one or more messages of response to the error messages received since the transmission of the last response message. In the described embodiment, this decision is a comparison of the emergency level with the reaction threshold, referenced Fs.

If step 30 results in the decision that no correction must be sent for the moment, the method returns directly to step 20 of initialisation of the variables FGi.

During step 22 which follows, the method detects that error messages are waiting for response and the following steps 24 to 28 are repeated. The development of certain factors results in the calculation of a new emergency level UR which is again compared with the reaction threshold Fs.

When the emergency level UR reaches the reaction threshold, it is decided to send a response message. The method of the invention then continues with a step 32 of determination of one or more error messages.

Figure 4A:
FIGS. 4A and 4B symbolically represent image losses.
Figure 4B:
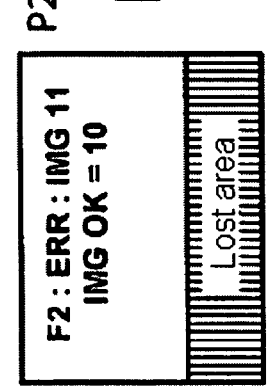

For example, the losses P1 and P2 occurring between the bridge and the terminals T1 and T2 as described with reference to FIGS. 4A and 4B are considered. FIG. 4A represents the loss P1 which occurs between the bridge and the terminal T1, relating to the upper part of an image identified as being image number 9 of the stream F1 transmitted by the terminal T1, the last correct image being image 8. This loss P1 occurs over 20 macroblocks out of the 100 which form the image.

FIG. 4B represents the loss P2 which occurs between the bridge and the terminal T2, relating to the lower area of image 11 of the stream F2, the last correct image being image 10. This loss P2 occurs over 30 macroblocks out of the 100 which form the image.

Hereafter it will be accepted that the reaction threshold Fs is fixed at 1 and that the factors λ are fixed at 1. The memory 10 has, in the example, a capacity of 10 images. The following table shows the development of UR over time. The indices 1 and 2 of the factors fq, ft and fstat as well as of the level of seriousness FG correspond to the losses P1 and P2 respectively.

| | | |
|---|---|---|
| Image 12 | Loss P1 signalled by T1 | UR = Σ FGi. = F1 = 0.7 |
| | f1q = 0.2 | UR < Fs, No reaction |
| | $f1t = \dfrac{12-8}{10} = 0.4$ | Transmission of image 12 |
| | f1stat = 0.1 | |
| | where | |
| | FG1 = f1q + f1t + f1stat = 0.7 | |
| Image 13 | f1q = 0.2 | UR = Σ FGi. = F1 = 0.8 |
| | $f1t = \dfrac{13-8}{10} = 0.5$ | UR < Fs, No reaction |
| | | Transmission of image 13 |
| | f1stat = 0.1 | |
| | where | |
| | FG1 = f1q + f1t + f1stat = 0.8 | |
| Image 14 | f1q = 0.2 | UR = Σ FGi. = FG1 + FG2 = 1.6 |
| | $f1t = \dfrac{14-8}{10} = 0.6$ | UR > Fs, Reaction |
| | f1stat = 0.1 | Transmission of a correction image in place of image 14 |
| | where | |
| | FG1 = f1q + f1t + f1stat = 0.9 | |
| | Loss P2 signalled by T2: | |
| | f2q = 0.3 | |
| | $f2t = \dfrac{14-10}{10} = 0.4$ | |
| | f2stat = 0.05 | |
| | where | |
| | FG2 = f2q + f2t + f2stat = 0.75 | |
| Image 15 | No loss | UR = 0 |
| | | UR < Fs, No reaction |
| | | Transmission of image 15 |

Thus, in this example, it is decided to send a response message during the transmission of image 14, following the reception of losses P1 and P2.

Different solutions are possible for the implementation of the step 32 of determination of response messages. Advantageously, this determination step 32 comprises a grouping 34 of the different error messages in order to reduce the number of response messages with respect to the number of error messages.

Figure 5:
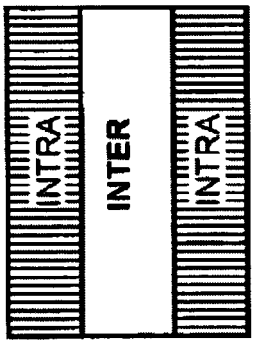
FIG. 5 represents a correction image.

Advantageously, the different corrections are combined during a step 36, in such a way as to provide a combined response to different error messages. An example of a correction image transmitted in a combined response message following the reception of the losses P1 and P2 is described with reference to FIG. 5.

In this figure, the upper and lower parts corresponding to the lost areas are intracoded, i.e. without reference to the preceding images, whereas the central part is intercoded normally with reference to the preceding images. Thus, on replacing image 14 in the output stream by this image 14 corresponding to the correction image, the conferencing bridge responds simultaneously to each of the error messages transmitted resulting from the losses P1 and P2.

Alternatively, the error messages are analysed in order to apply a correction common to all during step 38. For example, when several successive error messages relate to a same image or image part which is badly restored by several terminals, a single response message is transmitted to all of the terminals.

Moreover, in the example, the grouping step 34 also comprises a selection 40 of error messages to which no response is given. In particular, when error messages relate to images prior to the transmission an image that is entirely intracoded, it is no longer necessary to answer it. Alternatively, when several error messages relate to successive images, only the last error message is selected for receiving a response message.

Finally, the step 32 of determination of a response message comprises a step 42 of formatting the response message, i.e. formatting the correction image.

Figure 6:
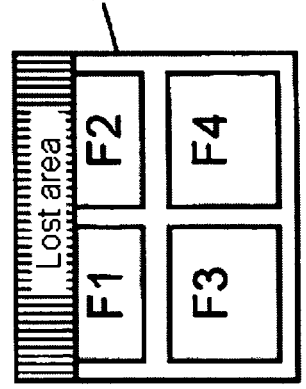
FIG. 6 symbolically represents an image loss.

In the example, the four input streams are formatted during a step 44 in order to form the output stream. When an error message relating to an image of the output stream must receive a response, it is appropriate to identify the correction images in the input streams. As described with reference to FIG. 6, the loss P1 relates both to an image of the input stream F1 and to an image of the input stream F2.

The conferencing bridge must then identify the correction images corresponding to these losses in the input streams F1 to F4 and reformat them in order to integrate them in the response message. The response message is then a correction image in which the correction images originating from input streams F1 and F2 are placed in their respective sectors.

Advantageously, the formatting step 42 also comprises the encoding of the correction image, during a step 46, in anticipation of its transmission. In the case where the analysis of the error messages makes it possible to determine the last image correctly received by all the terminals, the correction image is intercoded with respect to that image in order to obtain better restoration. In the example described with reference to FIG. 5, the correction image transmitted in response to the losses P1 and P2 comprises a central part interceded with respect to image 8, the last image correctly received by all the terminals.

Finally, the method comprises a step 48 of transmission of the correction image. As mentioned previously, this transmission can be carried out by a specific message or the correction image can be transmitted instead of an image of the output stream. In the example, the correction image replaces image 14 of the output stream.

Thereafter, the method returns to step 18 of initialisation of the variable UR and the method is repeated for the next error messages.

It should be noted that, in the embodiment described, the use of the time factor for the calculation of the level of seriousness and therefore of the emergency level, makes it possible to determiner a maximum response time. In fact, this factor increases on transmission of each new image such that, depending on the associated weighting coefficient, it is possible to define a maximum time between the reception of an error message and the transmission of a response message. For example, this maximum time is chosen to be equal to the duration of the buffer memory of the conferencing bridge 2 so that the latter has the necessary correction images available locally. In the described embodiment, the value Fs corresponding to the reaction threshold is allocated to the time factor when an error message relates to an image which is no longer in memory. As the weighting coefficient associated with the time factor is equal to 1, a response will be given to such an error message as soon as it is received.

Of course, other embodiments are also possible.

In a first variant, the broadcasting equipment comprises a large memory and is designed to decode the input video streams, store them in its memory in decoded form and then re-encode them for the terminals. The broadcasting equipment thus becomes in some way the transmitter of the content from the point of view of the decoding terminals.

In such an embodiment, the possibilities of encoding the correction image by the broadcasting equipment are very significant since a large portion of the preceding images is available.

According to this variant of the invention, the method comprises a step of storing, by the broadcasting equipment, of a decoded version of the images transmitted in the output stream and the correction images or image parts originate from the images stored by the broadcasting equipment.

Thus, during reception of several error messages, the analysis makes it possible to determine which is the last image transmitted without error for each of the terminals and then the conferencing bridge transmits a correction message by encoding the current image with respect to the last image received without error by all of the terminals. Thus, this single correction message will allow all the terminals to rejoin the progress of the video sequence.

In comparison with the previously described example, with the losses P1 and P2, such an embodiment allows the transmission of a single response message comprising the correction image 14 encoded with respect to image number 8 of the sequence, this image number 8 having been received correctly by all of the terminals.

In yet another variant, the broadcasting equipment has only a limited memory available and must transmit requests to each of the content transmitters in order to obtain the images or image parts forming the correction messages.

Thus, the invention makes it possible to finely analyse the error messages on the feedback channel and to quantify their seriousness in order to decide upon their processing. This quantification also makes it possible to optimize the response messages by filtering the messages made useless by pre-processing, by calculating a maximum reaction time according to a plurality of criteria for delaying the response to an error message, by applying priorities to the sending of response messages, according to the seriousness of the loss or to the degradation of the quality or according to yet other factors.

In this alternative, the method comprises a step of transmission of a request for correction images by the broadcasting equipment to one or more image transmitters, in order to receive in return said correction images to be included in said response message or messages. In this case, the broadcasting equipment is a relay in the broadcasting system.

The invention also makes it possible to aggregate several feedback messages or to format the feedback message according to the format of the established transmission.

In a particular embodiment, said grouping comprises the aggregation of at least two corrections to be applied to different error messages in order to form a combined response message.

As a variant, said grouping comprises the determination of a correction common to at least two error messages in order to form a common response message.

Alternatively, said grouping comprises the selection of error messages to which no response is provided.

More particularly, said analysis comprises an identification, in the various error messages, of the images or image parts which are not restored or badly restored and said step of determination of response messages comprises the determination of a common response message for the different error messages relating to the same images or image parts. This embodiment makes it possible to transmit only one response message when several error messages relating to a same image are sent by several pieces of restoration equipment.

Moreover, the invention can also use any combination of the described variants.

Of course, the invention is not limited to a multi-broadcasting system such as described but can be implemented in other environments such as a point-to-point broadcasting when several error messages on the feedback channel are received successively from the same terminal or in any other type of system for broadcasting video sequences.

Moreover, the invention can be implemented using a computer program as described or by other means such as electronic cards, programmed components or other means.

The invention claimed is:

1. Method for broadcasting images from a video sequence, the method comprising the following steps, at the level of broadcasting equipment:
   including images in an output stream for transmission to at least one restoration equipment;
   receiving feedback from said restoration equipment of error messages relating to the restoration of the images from the video sequence;
   analyzing the error messages in order to identify images or parts of images not restored or badly restored;
   identifying a last image transmitted without error;
   estimating the time between a current image and the last image transmitted without error;
   determining response messages including correction images or parts of correction images, wherein the method furthermore comprises:
      determining a level of seriousness for each of the error messages according to the estimated time between the current image and the last image transmitted without error;
      deciding to return a response message relating to each of the error messages according to the level of seriousness of that error message; and
      determining and transmitting the response message comprising a correction image encoded with respect to said last image transmitted without error.

2. Method according to claim 1, wherein said analyzing comprises determining at least one factor originating from the following group:
   a restoration quality level taking account of the error;
   an evaluation of the images or parts of images which are not restored or badly restored with respect to the importance of their content;
   decoding parameters; and
   an evaluation of the transmission conditions;
   said factor being used for determining the level of seriousness associated with the error message.

3. Method according to claim 1, wherein said level of seriousness of at least one error message is a maximum waiting time before the transmission of the response message.

4. Method according to claim 1, wherein the method comprises determining an emergency level from the levels of seriousness associated with the error messages received since the transmission of the last response message and said deciding is carried out according to this emergency level.

5. Method according to claim 1, wherein said determining response messages comprises grouping response messages.

6. Method according to claim 1, wherein said including images in a stream comprises formatting several input streams in order to form said output stream, said analysing the error messages comprises identifying the images not restored or badly restored in said input streams and said determining a response message comprises modifying correction images originating from said input streams in order to make them conform with the format of the output stream.

7. A non-transitory computer readable storage medium with an executable program stored thereon, wherein the program includes instructions for implementing:
   including images in an output stream for transmission to at least one restoration equipment;
   receiving feedback from said restoration equipment of error messages relating to the restoration of the images from the video sequence;
   analyzing the error messages in order to identify images or parts of images not restored or badly restored;
   identifying a last image transmitted without error;
   estimating the time between a current image and the last image transmitted without error;
   determining response messages including correction images or parts of correction images,
   determining a level of seriousness for each of the error messages according to the estimated time between the current image and the last image transmitted without error;
   deciding to return a response message relating to each of error messages according to the level of seriousness of that error message; and
   determining and transmitting the response message comprising a correction image encoded with respect to said last image transmitted without error.

8. Equipment for broadcasting images of a video sequence, comprising:
   a transceiver for transmitting an output stream comprising images for a transmission to at least one restoration equipment and for receiving in return from said restoration equipment of error messages relating to the restoration of the images of the video sequence;
   wherein the equipment comprises moreover:
   a microcontroller for analyzing the error messages in order to identify the images or parts of images not restored or badly restored, for identifying a last image transmitted without error, for estimating the time between a current image and the last image transmitted without error, for determining response messages including correction images or parts of correction images, for determining a level of seriousness for each of the error messages according to the estimated time between the current image and the last image transmitted without error, for deciding to return a message of response to each of the error messages according to the level of seriousness of each error message, and for determining and transmitting the response message comprising a correction image encoded with respect to said last image transmitted without error.

9. System for broadcasting images of a video sequence, comprising at least one transmitter of images, and an equipment for broadcasting to at least one restoration equipment (T1-T4), wherein said broadcasting equipment is an equipment according to claim 8.

10. Equipment according to claim 8, wherein said microcontroller is further arranged to determine at least one factor originating from the following group:
- a restoration quality level taking account of the error;
- an evaluation the images or parts of images which are not restored or badly restored with respect to the importance of their content;
- decoding parameters; and
- an evaluation of the transmission conditions;
  said factor being used for determining the level of seriousness associated with the error message.

11. Equipment according to claim 8, wherein said level of seriousness of at least one error message is a maximum waiting time before the transmission of the response message.

12. Equipment according to claim 8, wherein the microcontroller is further arranged to determine an emergency level from the levels of seriousness associated with the error messages received since the transmission of the last response message and the microcontroller is adapted to use this emergency level for deciding to return a message of response to an error message according to the level of seriousness of this error message.

13. Equipment according to claim 8, wherein said microcontroller is adapted for grouping response messages.

14. Equipment according to claim 8, wherein said microcontroller is adapted for formatting several input streams in order to form said output stream, for identifying the images not restored or badly restored in said input streams and for modifying correction images originating from said input streams in order to make them conform with the format of the output stream.

* * * * *

UNITED STATES PATENT AND TRADEMARK OFFICE
CERTIFICATE OF CORRECTION

PATENT NO. : 8,505,060 B2
APPLICATION NO. : 12/227824
DATED : August 6, 2013
INVENTOR(S) : Baillavoine et al.

Page 1 of 1

It is certified that error appears in the above-identified patent and that said Letters Patent is hereby corrected as shown below:

In the Specifications

In column 1 line 19, Change "interceding)," to --intercoding),--.
In column 1 line 25, Change "interceding" to --intercoding--.
In column 1 line 30, Change "interceding" to --intercoding--.
In column 1 line 65, Change "interceded" to --intercoded--.
In column 7 line 63, Change "interceded" to --intercoded--.

In the Claims

In column 10 line 26, In Claim 6, Change "a" to --an output--.
In column 11 line 18, In Claim 9, Change "equipment (T1-T4)," to --equipment,--.
In column 11 line 24, In Claim 10, change "evaluation the" to --evaluation of the--.

Signed and Sealed this
Twenty-ninth Day of April, 2014

Michelle K. Lee
*Deputy Director of the United States Patent and Trademark Office*